(12) United States Patent
Champaneria et al.

(10) Patent No.: US 9,146,116 B1
(45) Date of Patent: Sep. 29, 2015

(54) AUTOMATIC CONTINUED SEARCH

(71) Applicant: Google Inc., Mountain View, CA (US)

(72) Inventors: Amay Nitin Champaneria, San Francisco, CA (US); Frederick Peter Brewin, San Francisco, CA (US); Vivek Raghunathan, Mountain View, CA (US); Karthik Lakshminarayanan, Mountain View, CA (US); Aparna Chennapragada, Mountain View, CA (US); Ramakrishnan Srikant, Cupertino, CA (US); Vineet Gupta, Palo Alto, CA (US); Carl Lischeske, San Francisco, CA (US); Mahesh Keralapura Manjunatha, Sunnyvale, CA (US); Carolyn Au, Menlo Park, CA (US); Ramanathan Guha, Los Altos, CA (US); Ravi Kolluri, Fremont, CA (US); Pablo Bellver, Mountain View, CA (US); Kiran Panesar, Cupertino, CA (US); Andrew Dai, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/296,375

(22) Filed: Jun. 4, 2014

(51) Int. Cl.
    *G01C 21/20* (2006.01)
(52) U.S. Cl.
    CPC ...................................... *G01C 21/20* (2013.01)
(58) Field of Classification Search
    USPC ....................................................... 701/408
    See application file for complete search history.

(56) References Cited

U.S. PATENT DOCUMENTS

| | | | |
|---|---|---|---|
| 7,864,073 B2 * | 1/2011 | Lee et al. .................... | 340/988 |
| 8,010,285 B1 * | 8/2011 | Denise ........................ | 701/417 |
| 8,024,111 B1 * | 9/2011 | Meadows et al. ............ | 701/414 |
| 8,412,699 B1 | 4/2013 | Mukherjee et al. | |
| 8,606,517 B1 * | 12/2013 | Ehrlacher et al. ............ | 701/465 |
| 2002/0174021 A1 * | 11/2002 | Chu et al. .................... | 705/26 |
| 2004/0093154 A1 * | 5/2004 | Simonds et al. ............ | 701/200 |
| 2004/0093155 A1 * | 5/2004 | Simonds et al. ............ | 701/200 |
| 2004/0225557 A1 * | 11/2004 | Phelan et al. ................ | 705/11 |
| 2007/0208497 A1 * | 9/2007 | Downs et al. ................ | 701/117 |
| 2008/0294619 A1 | 11/2008 | Hamilton et al. | |
| 2009/0240517 A1 * | 9/2009 | Pelter .......................... | 705/1 |
| 2012/0254763 A1 * | 10/2012 | Protopapas et al. ........ | 715/738 |
| 2013/0261957 A1 * | 10/2013 | Mahapatro et al. .......... | 701/426 |
| 2013/0332406 A1 * | 12/2013 | Gilliam et al. ................ | 706/52 |
| 2014/0156188 A1 * | 6/2014 | Hart et al. .................... | 701/538 |

FOREIGN PATENT DOCUMENTS

| | | |
|---|---|---|
| WO | 2013147909 | 10/2013 |
| WO | 2013192591 | 12/2013 |

* cited by examiner

*Primary Examiner* — Thomas Tarcza
*Assistant Examiner* — Alex C Dunn
(74) *Attorney, Agent, or Firm* — Middleton Reutlinger

(57) ABSTRACT

Methods and apparatus for providing travel-related information for a location to a user based on activity indications of the user that are related to the location. The location may be determined based on a set of one or more related activity indications and a travel-related score may be determined for the location that is indicative of likelihood that the user has interest in travelling to the location. The user may be provided the travel-related information for the location based on the travel-related score.

40 Claims, 8 Drawing Sheets

Chicago Vacation Guide

Chicago Tourist Attractions

|   | Attraction |
|---|---|
| 1 | Willis Tower |
| 2 | Water Tower Place |
| 3 | Millennium Park |
| 4 | Navy Pier |

*Click to see more*

500

Restaurants near Vacation Inn

1. Restaurant 1 (Pizza) ★ ★ ★

2. Restaurant 2 (Pizza) ★ ★

3. Restaurant 3 (Steak) ★ ★ ★ ★ ★

505

Search Results

ExampleURL1.com
    Snippet of text from Webpage1
ExampleURL2.com
    Snippet of text from Webpage2
ExampleURL3.com
    Snippet of text from Webpage3

510

Chicago Cubs Schedule (May 15-May 19)

| May 15 | May 16 | May 17 | May 18 | May 19 |
|---|---|---|---|---|
| HOME | HOME | HOME | AWAY | AWAY |

Click a date to buy tickets

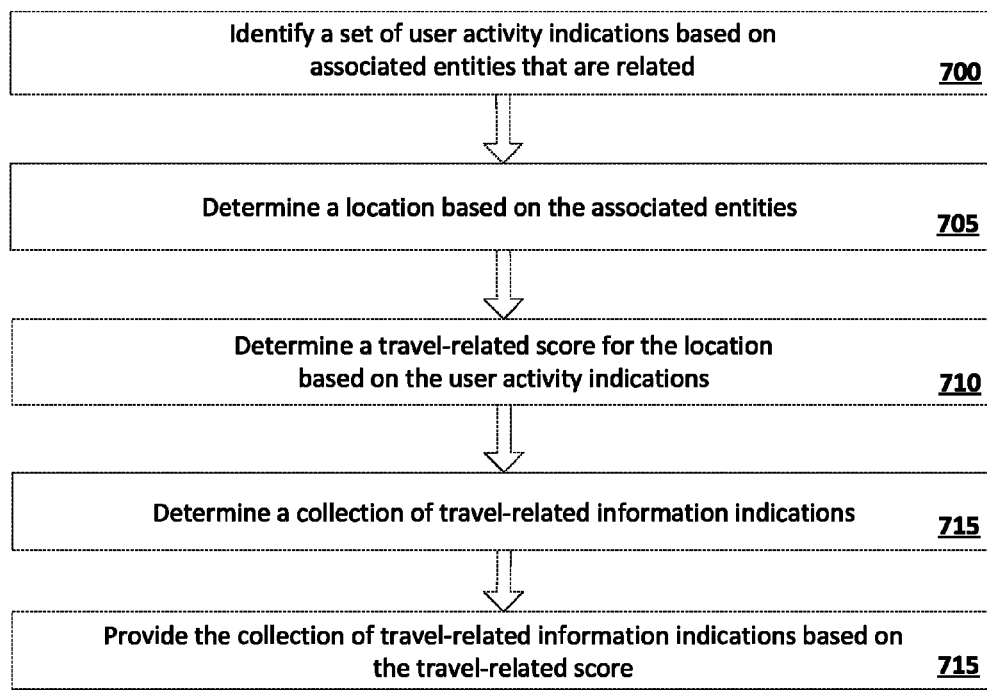

AUTOMATIC CONTINUED SEARCH

BACKGROUND

A user may perform one or more activities related to future travel plans. For example, a user may submit a search query that is related to a planned destination with the intention of receiving information related to the destination and/or related to traveling to the destination.

SUMMARY

The present disclosure is generally related to providing information that is associated with travel to a location based on user activity indications of a user. Particular implementations are directed to identifying a plurality of activity indications of a user that are each associated with one or more entities, identifying a set of activity indications based on one or more associations between the entities of the activity indications of the set, determining a travel-related score for a location that is associated with the entities of the set, and providing travel-related information for the location based on the travel-related score. The travel-related score is indicative of likelihood that the user has interest in traveling to the location. The travel-related score may be determined for a location based on, for example, one or more attributes of the user, one or more properties of the activity indications of the set, and/or one or more properties of the location. For example, a travel-related score may be determined for a location based on determining that the user has traveled to the location previously, based on identifying an activity indication of the user that indicates a hotel reservation for the location, and/or based on identifying that the location is a popular vacation location.

In some implementations, the travel-related information for the location may be provided to a user when the travel-related score satisfies a threshold and may be provided in response to a user interface indication by the user that is unrelated to a search query submission by the user. For example, the set of activity indications utilized to determine the location may be a plurality of search queries and the travel-related information may be surfaced to the user following cessation of activities related to the search queries of the set—and surfaced independent of any new search query submission by the user. In some implementations, travel-related information may be provided to the user as a collection of travel-related information indications. For example, the user may be provided with a collection of suggested activities related to the location, directions related to the location, map(s) related to the location, and/or snippets from and/or links to documents associated with the location. In some implementations, travel-related information may be tailored based on the activity indications of the set utilized to determine the location, user attributes, and/or other factors.

In some implementations, a computer implemented method may be provided that includes: identifying a plurality of activity indications of a user, each of the activity indications associated with one or more entities; identifying a set of the activity indications from the plurality of activity indications based on one or more of the entities associated with the activity indications of the set; determining a location based on one or more of the entities associated with the activity indications of the set; determining a travel-related score for the location based on the activity indications of the set, wherein the travel-related score is indicative of likelihood that the user has interest in traveling to the location; determining a collection of travel-related information indications, wherein each of the travel-related information indications identifies travel-related information for the location that may be of interest to the user; and providing the collection of travel-related information indications based on the travel-related score satisfying a threshold and in response to a user interface activity indication.

This method and other implementations of technology disclosed herein may each optionally include one or more of the following features.

In some implementations, the method further includes: providing a general travel information indication related to the location based on the travel-related score, wherein the general travel information indication indicates the location and the presence of information related to travel to the location; and identifying a user selection of the general travel information indication; wherein providing the collection of travel-related information indications is in response to identifying the user selection of the general travel information indication.

In some implementations, determining the collection of travel-related information indications includes: identifying a plurality of documents related to travel to the location; ranking the plurality of documents; selecting one or more of the documents based on the ranking; and determining one or more of the travel-related information indications of the collection based on the selected one or more of the documents. In some of those implementations, the ranking is based on at least one of the activity indications of the set of activity indications. In some of those implementations, the ranking is based on the determined location.

In some implementations, the user activity indications are each associated with an activity type. In some of those implementations, determining the travel-related score is based on the activity type of at least one of the activity indications of the set.

In some implementations, determining the travel-related score includes determining an activity time of at least one of the activity indications of the set and a current time and determining the travel-related score based on comparing the activity time of at least one of the activity indications of the set with the current time. In some of those implementations, the activity type of a given activity indication of the set is a search query and the activity time is based on a submission time of the search query by the user. In some of those implementations, the greater a difference is between the current time and the activity time, the less indicative the travel-related score is of user interest in traveling to the location.

In some implementations, the travel-related information indications of the collection include one or more of: a snippet from and a link to a document, travel directions, and a point of interest suggestion.

In some implementations, at least one of the travel-related information indications of the collection is determined from multiple sources.

In some implementations, determining the travel-related score includes determining a likely travel time, the likely travel time indicative of when the user has interest in traveling to the location. In some of those implementations, determining the travel-related score occurs at a first time, and the method further includes: adjusting the travel-related score at a second time based on the second time and the likely travel time, and wherein the second time is after the first time. In some of those implementations, adjusting the travel-related score includes adjusting the travel-related score to be more indicative of user interest in travelling to the location when the second time is closer to the likely travel time than the first time. In some of those implementations, adjusting the travel-related score includes adjusting the travel-related score to be less indicative of user interest in traveling to the location when the second time is after the likely travel time.

In some implementations, determining the travel-related score includes identifying at least one user location that is associated with the user and comparing the user location to the determined location.

In some implementations, determining the travel-related score is based on a familiarity measure indicative of familiarity of the user with one or more of the entities of the activity indications of the set.

In some implementations, the method further includes determining a current location of the user, wherein determining the travel-related score is based on a distance between the current location of the user and the location.

In some implementations, the method further includes determining a familiar location of the user, wherein determining the travel-related score is based on comparison of the familiar location to the location.

In some implementations, a plurality of the travel-related information indications of the collection include non-sponsored content.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein provide additional information about a location based on user activity indications related to the location. In some implementations, the location may be determined based on identifying associations between the location and one or more entities that are associated with the user activity indications. The additional information may be provided based on a travel-related score for the location that is determined based on the user activity indications and/or other factors.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 is an example interface of travel-related information indications.

FIG. 6 is an example user interface that includes a general travel information indication.

FIG. 7 is a flow chart that illustrates a method for providing travel-related information to a user based on one or more activity indication of the user.

DETAILED DESCRIPTION

Figure 1:
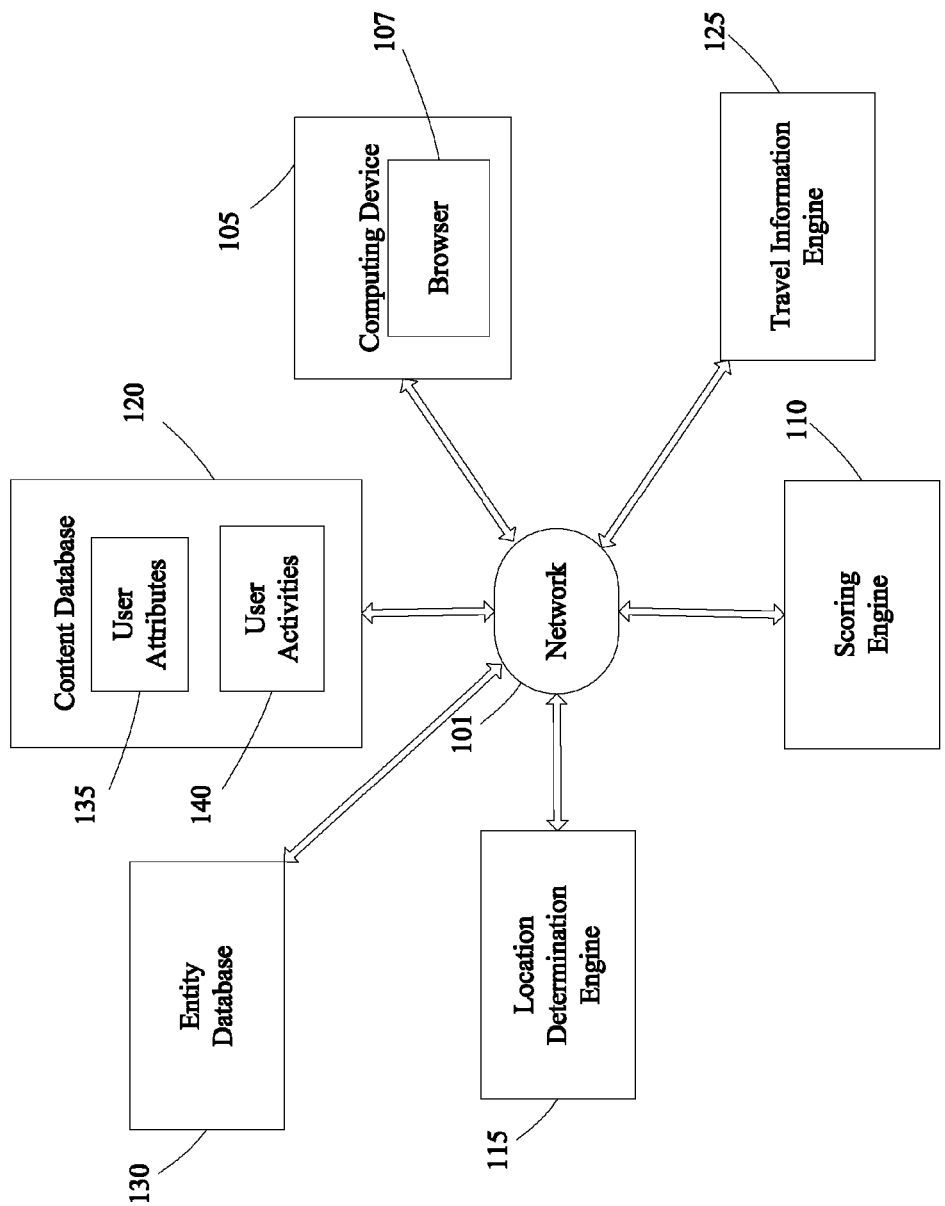
FIG. 1 illustrates a block diagram of an example environment in which information related to a location may be provided based on one or more activity indications of a user that are indicative of user interest in traveling to the location.

A user may perform one or more activities that are indicative of interest in traveling to a location. For example, a user may submit a search query that is related to an intended travel location, the user may access one or more webpages that are related to a vacation, the user may receive and/or view an e-mail confirming travel plans related to a location, and/or the user may create a calendar entry that is related to plane flights or dinner reservations for a restaurant that is not in the same city as the user's home.

As described in more detail herein, one or more of the activities of the user may be stored as activity indications that indicate information related to the activities. In some implementations, each of one or more of the activity indications may be associated with one or more entities related to the activity indication. For example, a user may submit a search query of "Chicago restaurants" and an activity indication for the search query submission may be associated with an entity associated with the city of "Chicago" and/or an entity associated with the place "restaurant". Also, for example, the user may submit a search query of "Chicago neighborhoods" and an activity indication for the search query submission may be associated with an entity associated with the city of "Chicago." One or more activity indications of a user may be identified as a set of related activity indications based on one or more relationships between the entities associated with the activity indications of the set. For example, for the preceding example, the activity indications of the two search requests may be identified as a set of activity indications based on identifying that both of the activity indications are associated with a "Chicago" entity.

A location may be determined based on one or more entities associated with the set of related activity indications. For example, for the "Chicago" example above, "Chicago" may be determined to be a location based on one or more of the entities associated with the previously mentioned user activity indications (e.g., the "Chicago" entity). A travel-related score may be determined that is indicative of likelihood that the user has interest in traveling to the determined location. In some implementations, the travel-related score may be based on information that is associated with one or more of the user activity indications. As one example, the travel-related score may be based on a quantity of the activity indications in the set, based on one or more of the entities associated with the activity indications in the set, and/or based on the strength of association of one or more of the entities with the activity indications in the set. Based on the travel-related score, travel-related information for the location may be provided to the user. For example, for the "Chicago" example above, based on the travel-related score satisfying a threshold, the user may be provided with travel-related information that includes: a snippet from and/or link to a webpage for restaurants in Chicago, a snippet from and/or link to a webpage for upcoming events in Chicago, and a listing of top tourist attractions in Chicago with links to further information about the tourist attractions. Determining which travel-related information to provide may be based on one or more techniques such as those described herein. Also, providing the travel-related information may be in response to a user interface indication of the user that is unrelated to a search query submission by the user. For example, for the "Chicago" example above, the travel-related information may be provided to the user after search results responsive to the "Chicago restaurants" and "Chicago neighborhoods" search queries have been provided and searching activities of the user related to those two queries has ceased.

FIG. 1 illustrates a block diagram of an example environment in which information related to a location may be provided based on one or more activity indications of a user that are indicative of user interest in traveling to the location. The example environment includes a communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment also includes a computing device 105, scoring engine 110, location determination engine 115, content database 120, and entity database 130.

Figure 8:
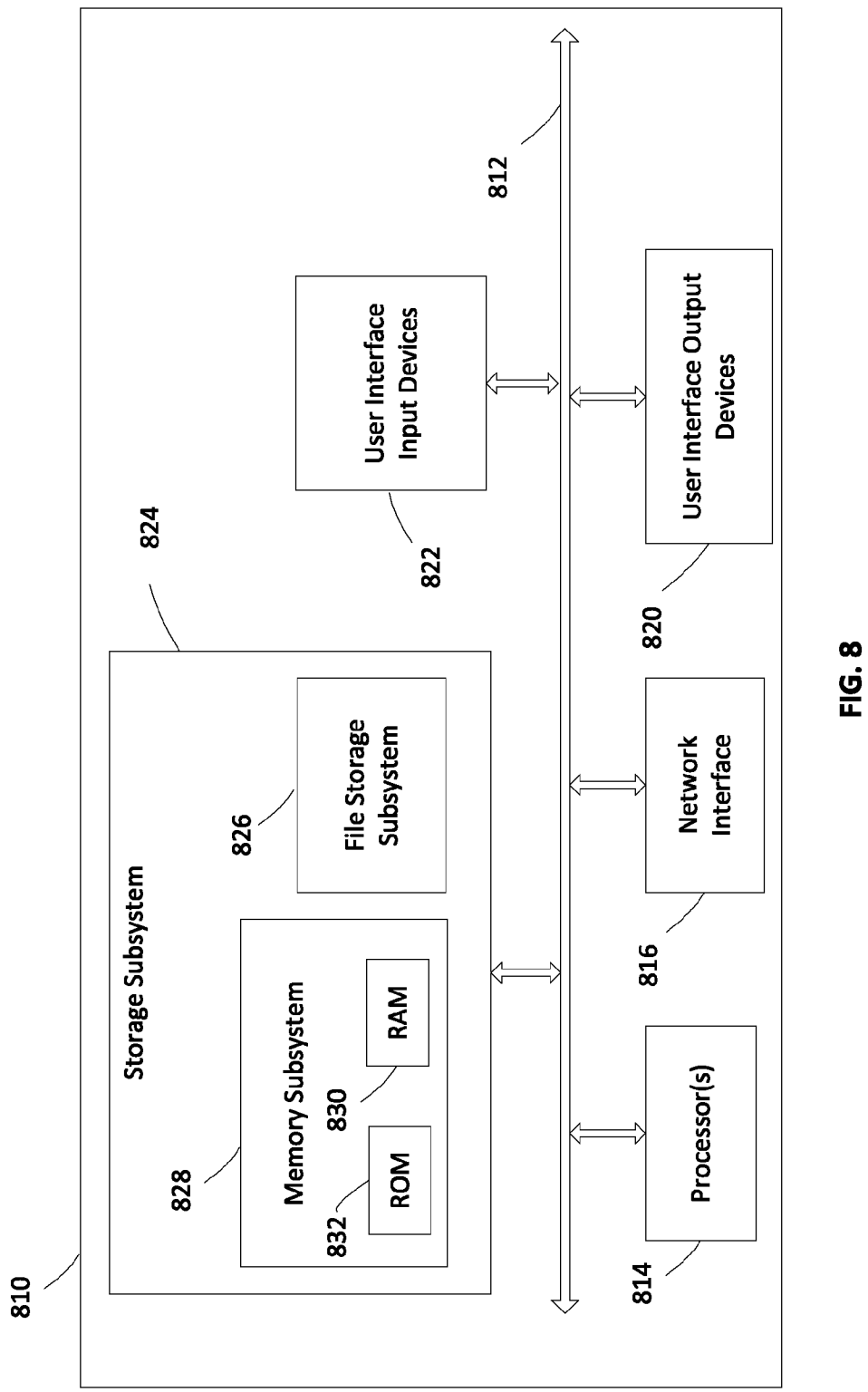
FIG. 8 illustrates a block diagram of an example computer system.

One or more of the components and/or one or more additional components of the example environment of FIG. 1 may each include memory for storage of data and software applications, a processor for accessing data and executing applications, and components that facilitate communication over a network. In some implementations, the components may include hardware that shares one or more characteristics with the example computer system that is illustrated in FIG. 8.

Generally, location determination engine 115 may identify one or more activity indications of a user and determine, based on the one or more activity indications, a location to which the user may be interested in travelling. In some implementations, location determination engine 115 may identify one or more activity indications 124 from content database 120. Content database 120 may include one or more storage media and may be utilized to store and/or access one or more aspects of information described herein. For example, content database 120 may be utilized by one or more components to store, modify, and/or access one or more activity indications 124 of a user and/or one or more user attributes 122 of a user. In some implementations, the content database 120 may store content of multiple users, and, for each user, access to the content of the user may be allowed only for the user and/or one or more other users or components authorized by the user, such as location determination engine 115, scoring engine 110, and/or travel information engine 125. In some other implementations, the content database 120 may store only content for a single user. For example, content database 120 may only include user attributes 135 and user activities 140 for a single user.

An activity indication of a user is indicative of one or more previous actions associated with a user. An activity indication of a user may be indicative of, for example, the user submitting a search query, the user accessing a document, the user sending and/or receiving a message, the user creating a calendar entry, and/or the user creating a task entry. In some implementations, an activity indication may include an activity time indicative of a time associated with the one or more previous actions indicated by the activity indication. For example, an activity indication of a user submitting a search query may include an indication of a submission time for the search query. Also, for example, an activity indication that a user has viewed an email may include an indication of when the user viewed the email. Also, for example, an activity indication that a user has received an email may include an indication of when the e-mail was received.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. In some implementations, one or more components may identify documents with certain data that has treated one or more ways to remove personal identifiable information and/or other information.

In some implementations, an activity indication may be associated with one or more entities that are indicative of information that is related to the activity indication. For example, the activity indication may include identifiers that directly identify one or more entities that are related to the activity indication. Also, for example, the activity indication may include content related to the activity indication that doesn't directly identify one or more entities, but that enables identification of one or more entities that are related to the activity indication. In some implementations, entities are topics of discourse. In some implementations, entities are persons, places, concepts, and/or things that can be referred to by a text fragment (e.g., a term or phrase) and are distinguishable from one another (e.g., based on context). For example, the text "chicago" may potentially refer to multiple entities such as the rock band Chicago or the city in Illinois. Also, for example, the text "sting" may refer to the musician Gordon Matthew Thomas Sumner or the wrestler Steve Borden.

In some implementations, an entity may be referenced by a unique entity identifier that may be used to identify the entity. An entity may be associated with one or more properties and/or one or more other entities related to the entity. For example, in some implementations, the entity database 130 may include properties associated with each of one or more entities and/or entities related to each of one or more entities. For example, the entity associated with the wrestler Steve Borden may be associated with a name or alias property of "Sting", another alias property of "Steve Borden", and/or an occupation property of "wrestler" in the content database 120. Also, for example, the entity associated with the wrestler Steve Borden may be associated with an entity associated with the wrestling organization "WCW" and/or with an entity associated with the wrestler "Ric Flair". Additional and/or alternative properties may be associated with an entity in one or more databases, such as entity database 130.

In some implementations, one or more associations between an activity indication and one or more entities associated with the activity indication may be weighted. For example, an activity indication for a submitted search query of "Chicago" may be associated with an entity associated with the city in Illinois and associated with an entity associated with the rock band, and the associations may be weighted. For example, the entity associated with the city in Illinois may be weighted more heavily for the activity indication than entity associated with the rock band based on information that indicates a stronger relationship between the query "Chicago" and the city than between the query and the rock band.

Figure 2:
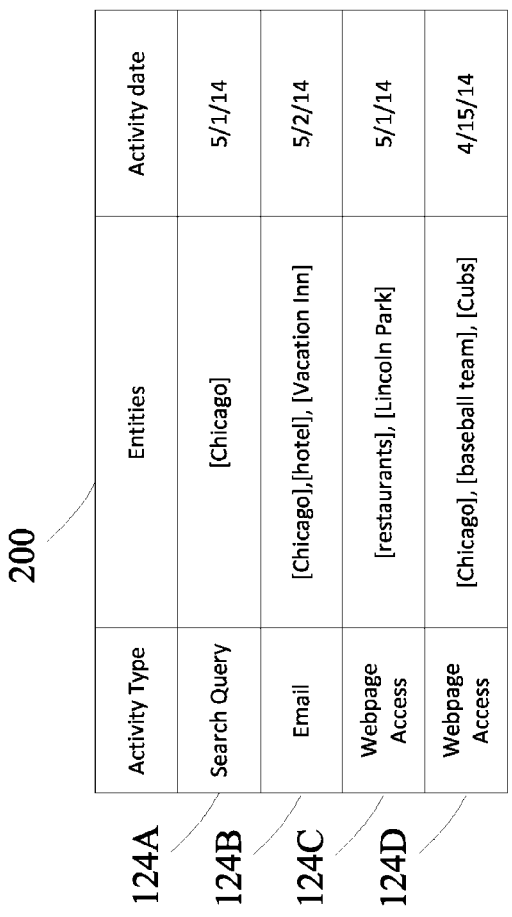
FIG. 2 is a table illustrating example activity indications of a user with associated entities, activity times, and activity types.

Referring to FIG. 2, a table 200 is provided illustrating example activity indications 124A-D of a user with associated entities, activity times, and activity types. In some implementations, location determination engine 115 may identify one or more of the activity indications 124A-D of table 200 from activity indications 124 of content database 120. Table 200 includes activity indication 124A indicative of a search query of the user, activity indication 124B indicative of an email sent and/or received by the user, an activity indication 124C indicative of a restaurant webpage viewed by the user, and an activity indication 124D indicative of a baseball webpage viewed by the user.

The activity indications 124A-D each include an activity type, one or more entities that are associated with the activity indication, and an activity date. Additional or alternate information may be included with activity indications than the information illustrated in the table 200. For example, in some implementations a given activity indication may include content of the activity indication and/or a link to content of the activity indication in addition to, or in lieu of entities. For example, in some implementations an activity indication of a submitted search query may include one or more terms of the submitted search query and the one or more terms may be utilized to identify one or more entities associated with the activity indication (e.g., based on a mapping between the term(s) and the entities). Also, for example, in some implementations an activity indication of a visited document may include content of the document and/or an identifier of the document (e.g., a URL) that may be utilized to identify one or more entities associated with the document. For example, the identifier of the document may be mapped to one or more entities in a database such as entity database 130.

As described herein, in some implementations, one or more of the entities of the activity indications 124A-D may be associated with a weight that is indicative of strength of relationship between the activity indication and the entity. For example, activity indication 124A is associated with a "Chicago" entity. In some implementations, the association between the "Chicago" entity and the activity indication 124A may have a weight that is indicative of, for example, the likelihood that the search query is related to "Chicago." Also, for example, the strength of relationship between the "restaurants" entity and the activity indication 124C may be indicative of, for example, the number of references to restaurants in the webpage that is associated with activity indication 124C.

Each of the activity indications 124A-D of table 200 includes an activity date. In some implementations activity times may additionally or alternatively be included. The activity date of an activity indication may be indicative of a date when the user performed the corresponding activity. For example, the activity date for activity indication 124A may be the date that the user submitted the search query. Also, for example, the activity date for activity indication 124C may be indicative of the first time or last time that the user accessed the webpage. In some implementations, an activity indication may be associated with multiple activity dates and/or times. For example, activity indication 124C may be associated with an activity time for each of the times that the user accessed the associated webpage. Alternatively, in some implementations where a user performs the same activity multiple times, a new activity indication may be identified with a corresponding activity time.

Location determination engine 115 may identify a set of activity indications based on one or more associations between the entities that are associated with the activity indications of the set. In some implementations, location determination engine 115 may identify a set of activity indications based on the activity indications being associated with one or more of the same entities. For example, referring to FIG. 2, location determination engine 115 may identify a set of activity indications that includes activity indication 124A, activity indication 124B, and activity indication 124D based on those activity indications being associated with a "Chicago" entity. In some implementations, location determination engine 115 may identify a set of activity indications based on strength of relationships between the entities and the corresponding activity indications. For example, location determination engine 115 may identify a set that includes activity indication 124A and activity indication 124B only if the weight between the "Chicago" entity and activity indication 124A and the weight between the "Chicago" entity and activity indication 124C satisfies a threshold (e.g., only if the Chicago entity is weighted more strongly than other entities for those activity indications and/or satisfies a set weight).

In some implementations, location determination engine 115 may determine a set of activity indications based on one or more indirect associations between the entities associated with the activity indications of the set. For example, with reference to FIG. 2, activity indication 124A is associated with a "Chicago" entity and activity indication 124C is associated with "Lincoln Park," a neighborhood of Chicago. Location determination engine 115 may identify a set of activity indications that includes activity indication 124A and activity indication 124C based on identifying an association between "Chicago" and "Lincoln Park" (e.g., in entity database 130). As another example, a first activity indication may be associated only with the entity associated with the park "Millennium Park" in Chicago and a second activity indication may be associated only with the entity associated with the building "Willis Tower" in Chicago. Location determination engine 115 may identify a set of activity indications that includes the first and second activity indications based on identifying that the "Millennium Park" entity and the "Willis Tower" entity share one or more associations such as both being associated with a "Chicago" entity and/or a "Chicago Tourist Attractions" entity. Optionally, a weight of the shared associations may be taken into account. For example, the association of the "Millennium Park" entity and the "Willis Tower" entity to the "Chicago" entity and/or a "Chicago Tourist Attractions" entity must each be associated with at least a threshold weight.

In some implementations, location determination engine 115 may identify a set of activity indications based on the activity indications being associated with one or more of the same entities, but only include an activity indication if a weight of an associated entity for that activity indication satisfies a threshold. For example, location determination engine 115 may identify a set of activity indications that includes activity indication 124A and activity indication 124B based on both activity indications including an entity in common (i.e., "Chicago"). However, location determination engine 115 may not include activity indication 124D (which is also associated with "Chicago") based on a weight of the "Chicago" entity for activity indication 124D failing to satisfy a threshold. For example, the weight of the "baseball team" and "cubs" entities for activity indication 124D may be greater than the weight for the "Chicago" entity for activity indication 124D. Based on the weight for the "Chicago" entity being less than the weight for the other entities for activity indication 124D, activity indication 124D may be omitted from the set of activity indications.

In some implementations, location determination engine 115 may identify a set of activity indications based on activity times and/or dates that are associated with the activity indications of the set. In some implementations, location determination engine 115 may identify a set of activity indications based on the activity times of the activity indications being within a threshold time of each other. For example, location determination engine 115 may identify a set that includes activity indication 124A, activity indication 124B, and activity indication 124C based on the activity times of those activity indications being within one day of each other. Also, for example, activity indication 124D may not be included in the same set based on that activity indication having an activity time that is more than a threshold time from the other activity indications of the set.

In some implementations, location determination engine 115 may adjust members of sets of activity indications as additional activity indications are identified. For example, location determination engine 115 may identify a set of activity indications that includes all of the activity indications illustrated in table 200 and subsequently add additional members to the set, split the set into subsets, and/or eliminate members from the set based on additional identified activity indications. For example, location determination engine 115 may identify a webpage search that is associated with a "Chicago" entity and a "White Sox" entity, eliminate activity indication 124D from the set that includes 124A, 124B, and 124C, and identify a new set that includes activity indication 124D and the activity indication that is associated with "Chicago" and "White Sox."

Location determination engine 115 may determine a location based on one or more of the activity indications of a determined set of activity indications. A location is an indication of a physical location such as a city, state, region, country, etc. In some implementations, a location may be determined based on one or more entities associated with activity indications of the set. For example, location determination engine 115 may identify a location based on one or more members of the set of activity indications being associated with an entity that is indicated as a "location" in entity database 130. In some implementations, one or more activity indications of a set of activity indications may be associated with an entity that is a location. For example, referring to FIG. 2, activity indication 124A is associated with a "Chicago" entity, which may have a "Location" property that indicates that "Chicago" is a location. Location determination engine 115 may determine a location of "Chicago" based on activity indication 124A being associated with the "Chicago" entity and/or based on identifying that one or more of the other activity indications of the set are associated with a "Chicago" entity.

Figure 3:
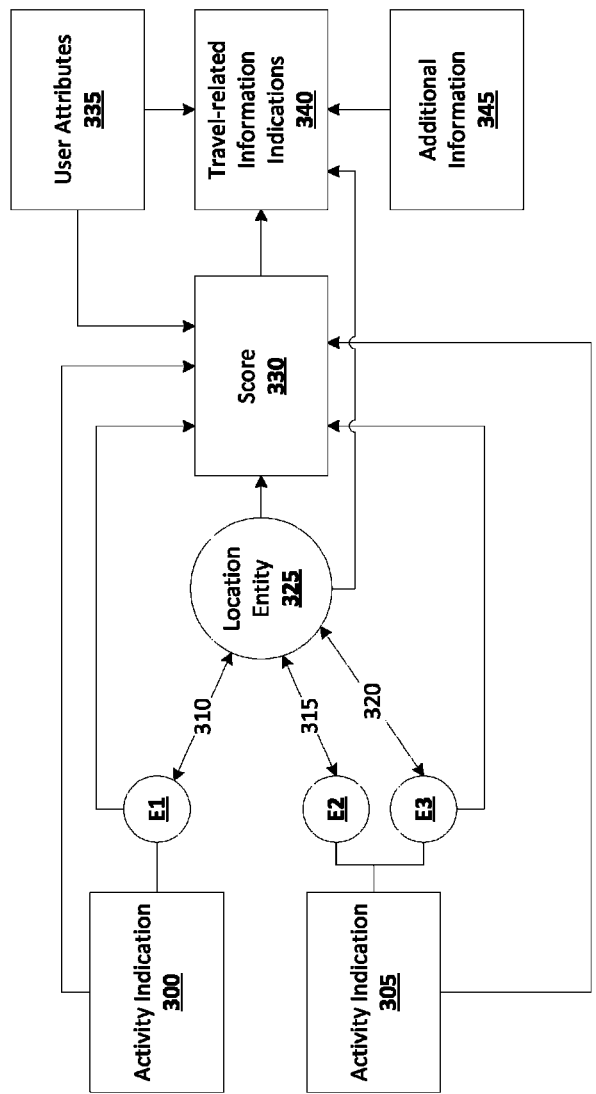
FIG. 3 is a flowchart for determining additional information about a location from a location entity.

Referring to FIG. 3, a flowchart for determining additional information about a location from a location entity is provided. In some implementations, one or more of the steps that are described with respect to FIG. 3 may be performed by one or more components of FIG. 1. Activity indication 300 is an activity indication of a user activity, such as, for example, a user submitting a search query. E1 is an entity that is associated with activity indication 300. For example, E1 may be an entity with an alias of one or more terms of the search query that is indicated by activity indication 300. E2 and E3 are entities that are associated with activity indication 305 which may be, for example, an indication of a user accessing a webpage. E2 and E3 may be entities that have been associated with the accessed webpage based on, for example, one or more terms that were identified from the webpage. As an example, E2 may be a "Lincoln Park" entity and E3 may be a "deep-dish pizza restaurants" entity based on the user accessing a webpage that includes information related to pizza restaurants in Lincoln Park. Location determination engine 115 may identify a set of activity indications that activity indication 300 and 305 based on identified associations between E1, E2, and E3.

In some implementations, location determination engine 115 may identify associations between each of the entities E1, E2, and E3 and one or more additional entities. For example, location determination engine 115 may identify that E1, E2, and E3 are associated with location entity 325 (i.e., associations 310, 315, and 320 respectively). Location entity 325 may be, for example, a "Chicago" entity. In some implementations, location determination engine 115 may identify one or more properties of location entity 325 and determine a location based on the properties. For example, location determination engine 115 may identify only entities that are associated with E1, E2, and E3 and that have a "location" property and not identify entities that are not representations of locations. Location determination engine 115 may determine a location of "Chicago" based on, for example, strength of relationships of the associations 310, 315, and 320. Also, for example, location determination engine 115 may determine the location based on the number of activity indications of the set that are associated with the location entity.

In some implementations, location determination engine 115 may determine a likely travel time to associate with a determined location. A likely travel time is a date and/or time that the user may have interest in traveling to the determined location. In some implementations, an activity indication may be associated with a travel time. For example, location determination engine 115 may identify an activity indication that includes a May 15 travel time and/or a range of dates (e.g., May 15 to May 20). In some implementations, location determination engine 115 may determine one or more likely travel times based on an activity indication, based on associated travel times that are determined from a set of activity indications, and/or based on one or more terms of documents that may be associated with the activity indications of the set. For example, location determination engine 115 may determine a travel time to associate with the determined location based on identifying an activity indication of a user creating a calendar entry that includes a date and an indication of the location. Also, for example, location determination engine 115 may identify a likely travel time from an email that includes a hotel reservation confirmation for a hotel that is near the location. Also, for example, location determination engine 115 may identify a likely travel time from a webpage that includes one or more dates (e.g., the user accessing a webpage for Chicago Cubs tickets on particular dates). In some implementations, location determination engine 115 may identify a default likely travel time if another travel time is not identified. For example, location determination engine 115 may identify a likely travel time that is two months in the future for one or more locations if a different travel time is not identified.

Location determination engine 115 may provide scoring engine 110 with one or more locations that have been determined for a set of activity indications. In some implementations, location determination engine 115 may store the determined location, one or more of the activity indications of the set, and/or additional information that may be associated with the activity indication entities and/or the location entity in content database 120. For example, location determination engine 115 may store a set of activity indications that includes an activity indication of a user accessing an email, information from the email, one or more entities that are associated with the activity indication, a determined location, and/or one or more properties of the entities in content database 120 for later utilization by scoring engine 110.

Scoring engine 110 may identify a determined location and determine a travel-related score for the location. A travel-related score is indicative of likelihood that the user has interest in traveling to the location. For example, location determination engine 115 may determine a "Chicago" location based on one or more activity indications of a user and scoring engine 110 may determine a travel-related score for "Chicago" that is indicative of likelihood that the user has interest in traveling to Chicago. In some implementations, a travel-related score for a location may be determined and utilized to provide a user with travel-related information that is related to the location.

In some implementations, a travel-related score may be a binary value. For example, a travel-related score may be determined for a location that is either indicative of user interest in traveling to the location or indicative of no interest of the user in traveling to the location. In some implementations, a travel-related score for a location may be a non-binary value. For example, scoring engine 110 may determine a travel-related score for a location that is a value between 0 and 100 and/or between one or more decimal values (e.g., a score between 0 and 1).

Referring again to FIG. 3, a score 330 may be determined based on one or more signals. For example, one or more properties and/or information that are related to activity indication 300 and/or activity indication 305 may be utilized to determine a travel-related score for a location. Also, for example, entities E1, E2, and/or E3 may be utilized to determine a travel-related score for a location. Also, for example, one or more user attributes 335 and/or additional information 345 that is associated with the user may be utilized to determine a travel-related score for the location.

In some implementations, scoring engine 110 may determine a travel-related score for a location based on one or more of the activity indications of the set that was utilized to determine the location. In some implementations, scoring engine 110 may determine a travel-related score based on the entities that are associated with one or more activity indications of the set. For example, scoring engine 110 may determine a travel-related score for a location based on one or more weights between the activity indications of the set and one or more entities that are associated with the activity indications, such as those entities utilized to determine the location. Also, for example, scoring engine 110 may determine a travel-related score based on whether one or more of the entities that are associated with the activity indications of the set (e.g., those utilized to determine the location) are associated with one or more other activity indications of the user that are not included in the set. For example, entities that are not associated with other activity indications of the user and/or are rarely associated with other activity indications of the user may result in a travel-related score more indicative of interest than entities that are frequently associated with other activity indications. In other words, in some implementations a set of activity indications associated with entities that are relatively rare for the user may result in a travel-related score more indicative of interest than a set of activity indications associated with entities that are relatively frequent for the user. In some implementations, scoring engine 110 may determine a travel-related score based on a count of the number of activity indications of the set and/or a count of the number of entities of the activity indications of the set that are associated with the location. For example, as the count increases, the travel-related score may become more indicative of interest in travel to the location.

In some implementations, a travel-related score may be determined for a location based on activity types of one or more of the activity indications of the set of activity indications that were utilized to determine the location. For example, scoring engine 110 may determine that multiple indications of calendar entries of the user may be more likely to include intended actions of the user than an activity indication of the user accessing a webpage. Scoring engine 110 may determine a travel-related score for a location that was determined based on a calendar entry that is more indicative of user interest in travelling to a location than a location that was determined from one or more activity indications of the user accessing a webpage.

In some implementations, scoring engine 110 may determine a travel-related score based on associations between one or more of the entities of the activity indications of the set. For example, a set of activity indications may be associated with a "Lincoln Park" entity, a "Lake Michigan" entity, and a "Halsted Street" entity. Scoring engine 110 may determine a travel-related score for the determined location based on strength of the relationships between the entities. In this example, Lincoln Park is a neighborhood that borders on Lake Michigan and includes Halsted Street. Based on the strong associations between the entities (e.g., as indicated in entity database 130), scoring engine 110 may determine a travel-related score for Chicago that is indicative of a high likelihood that the activity indications of the set are related to Chicago. In some implementations, scoring engine 110 may determine a travel-related score based on one or more entities of the activity indications of the set being associated with travel. Locations that are determined based on activity indications that are associated with travel-related entities, such as "restaurants," "hotel," and/or "attractions," may be highly indicative of user interest in travelling to the determined location. For example, scoring engine 110 may determine a score that is highly indicative of user interest in traveling to "Chicago" based on identifying that one or more of the activity indications of the set is associated with "Lincoln Park" and "tourist attractions."

In some implementations, scoring engine 110 may determine a travel-related score based on information that is associated with the determined location. For example, a determined location may be identified as a common travel destination and scoring engine 110 may determine a travel-related score that reflects the determined location being commonly visited. For example, a user may be more likely to have interest in travelling to a tourist city, such as Orlando, than to a small town with less attraction to travelers.

In some implementations, scoring engine 110 may determine a travel-related score for a location based on attributes of the user. Scoring engine 110 may identify one or more user attributes 135 from content database 120. Attributes of the user may include, for example, preferences of the user, previous travel locations of the user, and/or other attributes of the user. For example, a user may have an attribute that is indicative of the user commonly traveling to family vacation locations and scoring engine 110 may determine a travel-related score for Orlando that is more indicative of user interest in travelling to the location than a determined location of Cancun based on determining that Orlando is a more common family destination than Cancun.

In some implementations, a user attribute may include one or more locations that have been identified as familiar to the user. For example, a user may indicate a "home" location, a "work" location, and/or one or more preferred locations. Also, for example, one or more components may determine a familiar location of a user, such as a location that the user frequently visits and/or a location that the user has previously indicated as a "home" location. In some implementations, a travel-related score for a location may be based on a distance between the determined location and one or more familiar locations of the user. For example, scoring engine 110 may determine a travel-related score for a location that is farther away from a familiar location than a location that is near a familiar location, since the user is more likely interested in being provided travel information for a less familiar location. Also, for example, a user may commonly perform activities that are related to a "home" location but the user is unlikely to have interest in travel-related information regarding a "home" location where the user is commonly located.

Figure 4A:
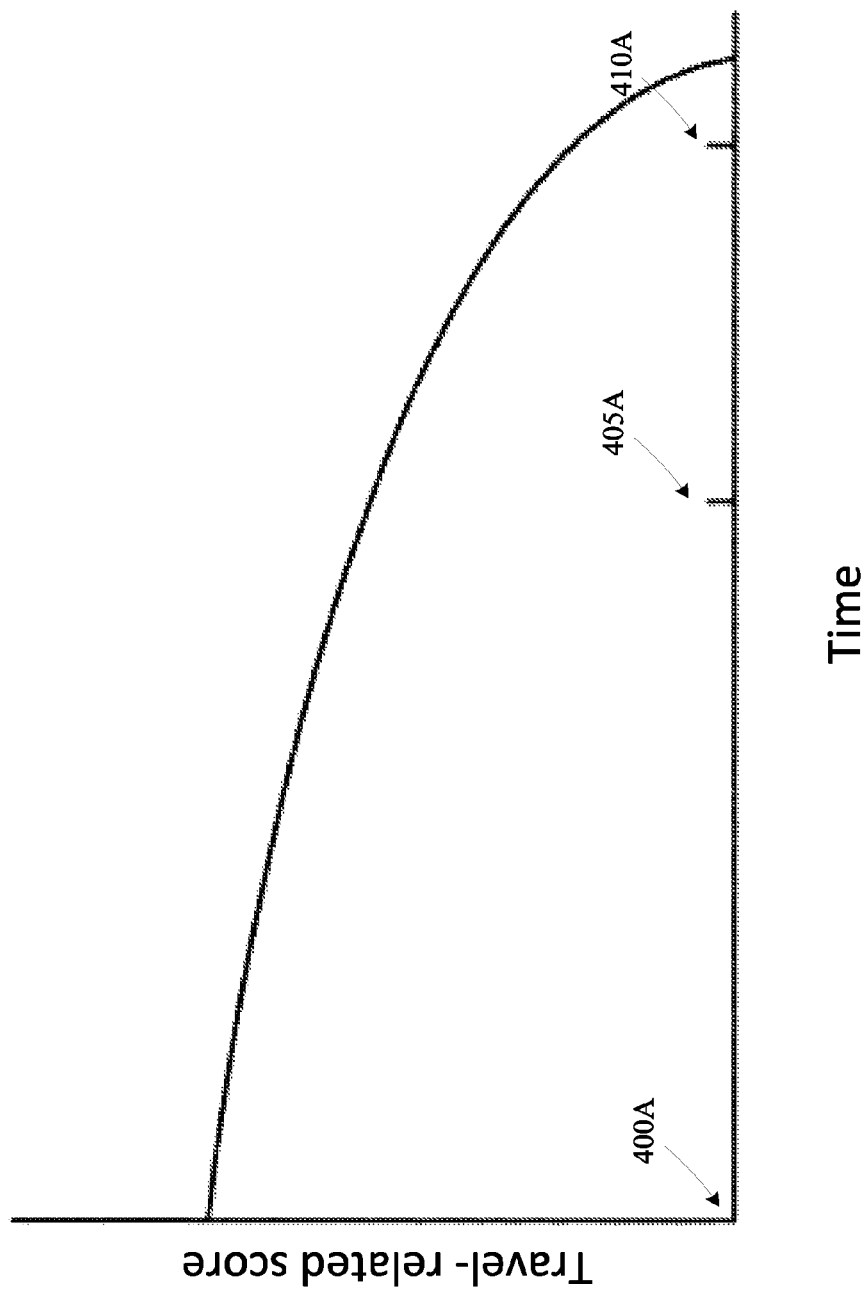
FIG. 4A is an example graph of a travel-related score for a location over time.

In some implementations, a travel-related score for a location may be determined based on an activity time of one or more of the activity indications of the set. For example, an activity time that is associated with an activity indication may be utilized to determine user interest in a location after the user performed the activity that is associated with the activity indication. As an example, referring to FIG. 2, activity indication 124A is associated with an activity time of May 1, 2014. The activity time of activity indication 124A may be a time when the user submitted the search query. In some implementations, the activity time of activity indication 124A may be compared to a current time to determine the likelihood that the location that was determined based on activity indication 124A (e.g., Chicago) is of interest to a user. A travel-related score may be adjusted based on the time that has passed since the activity time. For example, referring to FIG. 4A, an example graph of a travel-related score for a location over time is provided. Activity time 400A is an activity time of one or more activity indications of a set that was utilized to determine a location. As time progresses to current time 405A, the travel-related score is adjusted to be less indicative of user interest in being provided information that is related to the location. Additionally, the future time 410A is less indicative of user interest in being provided information that is related to the location than current time 405A. As time progresses and location determination engine 115 does not identify additional activity indications of the set that was utilized to determine the location, the travel-related score is adjusted to indicate that the user is less likely to have interest in the location. The degrading of a travel-related score as time elapses between the activity time of an activity indication and the current time may be indicative of a user performing one or more activities that are associated with the location and subsequently losing interest in the subject, thereby indicating less likelihood in having interest in being provided information that is related to the location. Also, for example, the degrading of travel-related score as time elapses from the last activity indication that is related to a location may be indicative of a false positive determination of the location and/or a false positive identification of a set of activity indications.

Figure 4B:
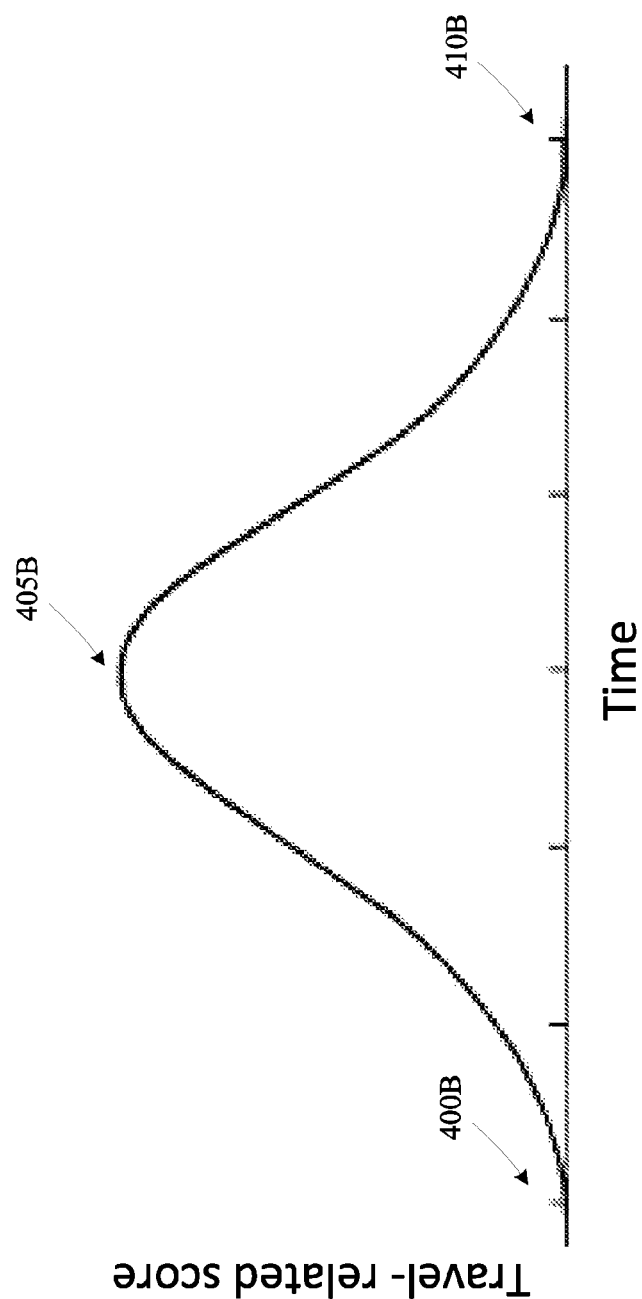
FIG. 4B is a graph illustrating another example of a travel-related score for a location over time.

In some implementations, scoring engine 110 may determine a travel-related score based on a likely travel time that was determined for a location. For example, referring to FIG. 4B, another example graph of a travel-related score for a location over time is provided. The initial travel-related score 400B may be an initially determined travel-related score for a location. Likely travel time 405B is indicative of a time that the user is likely to travel to the location. Likely travel time 405B may be determined based on one or more activity indications of the user and/or one or more documents associated with the user, as described herein. Time 410B is a later time that is after the likely travel time. As likely travel time 405A approaches, scoring engine 110 adjusts the travel-related score to reflect that the user has more interest in being provided travel-related information prior to and during the travel time than the user has interest in being provided with travel-related information at the later time 410B when the user has likely already traveled to the location.

Scoring engine 110 may provide travel information engine 125 with a travel-related score for the determined location. In some implementations, travel information engine 125 may determine a collection of travel-related information indications from one or more sources and provide the travel-related information indications based on the travel-related score. For example, travel information engine 125 may determine one or more travel-related information indications that are related to the determined location and provide the travel-related information indications to a user via computing device 105 if the travel-related score of the location satisfies a threshold (e.g., is indicative of user interest in being provided further information related to the location).

Travel-related information indications may include information about the determined location. In some implementations, the travel-related information indications may include information that may be useful to the user and/or that the user may have interest in viewing while visiting the location based on a travel-related score that is indicative of the user having interest in travelling to the location. For example, a user may be provided with a weather report for Chicago based on location determination engine 115 determining that Chicago is a location where the user may have interest in traveling (from a set of activity indications) and scoring engine 110 determining a travel-related score for Chicago that is indicative of user interest in being provided information that is related to travelling to Chicago.

In some implementations, travel-related information indications may be determined based on one or more of activity indications of the user. For example, travel information engine 125 may identify one or more documents that are associated with one or more of the activity indications of the set that was utilized to determine the location and further identify travel-related information in the documents. For example, a user may submit a search query and be provided one or more search results, and travel information engine 125 may identify information in one or more documents that are associated with the search results to determine information to provide to the user as a travel-related information indication. The travel-related information indication may link to one or more of the documents that were provided as search results and the user may be directed to one or more of those documents if the user selected the travel-related information indication. In some implementations, travel information engine 125 may determine travel-related information from one or more entities that are associated with one or more documents. For example, travel information engine 125 may identify an email that is associated with an activity indication of the user and determine travel information based on one or more entities that are associated with the email.

Referring again to FIG. 3, travel-related information indications 340 may be determined from one or more sources. In some implementations, one or more sources associated with the user and the determined location, such as emails, documents, and/or browsing history, may be utilized to determine travel-related information indications. For example, location determination engine 115 may determine a location of "Cancun" based on one or more activity indications of the user and travel information engine 125 may utilize an email that includes cruise confirmations to determine travel-related information indications related to cruises with itineraries that include Cancun, such as an email that is associated with one of the activity indications that was utilized to determine a "Cancun" location.

In some implementations, travel-related information indications may be determined based on one or more user attributes 335 that are associated with the user. User attributes may include, for example, travel preferences of the user, a regional location of the user, and/or other demographic information that has been provided by the user. In some implementations, travel information engine 125 may determine travel-related information indications for a user based on identifying documents and/or other travel-related information indications that have been accessed and/or utilized by other users with similar user attributes. For example, a location of "Chicago" may be determined for a user with a home location of "New York" and one or more travel-related information indications may be provided that was previously provided to other users with a home location of "New York" and/or from documents that were accessed and/or utilized by other users with a home location of "New York."

In some implementations, one or more terms of an activity indication of the set that is an indication of a search query may be utilized to formulate a new search query and search results of the new search query may be provided as travel-related information indications. For example, activity indications of a user submitting the search queries "Chicago hotels" and "pizza restaurants" may be utilized to determine the query "Chicago pizza" and search results responsive to the query "Chicago pizza" may be provided to the user as travel-related information indications. In some implementations, entities that are associated with the activity indications of the set of the user may be utilized to form new search queries. For example, one or more entities that are associated with activity indications of the set may be utilized to determine a search query to submit and one or more search results of the new search query may be provided to the user as travel-related information indications. In some implementations, a user may be provided with travel-related information indications based on travel-related information indications that were provided to other users with similar activity indication entities as the user. For example, a user that is associated with activity indications that are associated with E1, E2, and E3 may have interest in one or more travel-related information indications that were previously accessed and/or utilized by other users that have activity indications that are associated with E1, E2, and/or E3.

In some implementations, one or more entities may be mapped to one or more sources that may be utilized to determine travel-related information indications for a user. Mappings between entities and one or more sources may be determined based on, for example, identifying documents and/or other sources that were accessed by other users and entities associated with those users. As an example, one or more users that are associated with entities E1, E2, and E3 may have accessed documents D1, D2, and D3. Another user that is associated with E1, E2, and/or E3 may be provided one or more of D1, D2, and/or D3. For example, a user that is associated with E1, E2, and/or E3 may be provided with one or more travel-related indications that are determined based on content of D1, D2, and/or D3. In some implementations, the user may be provided with travel-related information indications that are determined only from documents and/or other sources that have not been accessed by the user. For example, referring to the previous example, the user may be provided with travel-related information indications from only D3 if the user has previously accessed D1 and D2 (e.g., as indicated by activity indications of the user).

In some implementations, one or more documents that may be utilized to determine travel-related information indications for a user may be identified based on mappings between the documents and one or more queries and/or search terms of queries previously submitted by one or more user. For example, a database may include mappings that indicate that users that submitted search query SQ1, search query SQ2, and search query SQ3 are likely to have interest in document D1 based on statistics related to past search query submissions of other users. A user that is associated with activity indications of submitting SQ1, SQ2, and SQ3 may be provided document D1 as a travel-related information indication and/or may be provided a travel-related information indication that is determined from content of D1 based on likelihood that the user has interest in similar documents as other users that have submitted the same or similar search queries.

Referring to FIG. 5, an example interface of travel-related information indications is provided. In some implementations, the travel information engine 125 may determine the travel-related information indications of FIG. 5 based on a location provided by location determination engine 115 and provide the travel-related information indications to computing device 105 for presentation to a user of computing device 105. The travel-related information indications include an attractions indication 500, a restaurants indication 505, a search results indication 510, and a sports indication 515. The travel-related information indications may be determined and provided based on one or more of the techniques described herein.

In some implementations, the user may be provided with one or more travel-related information indications independent of a new query submission of the user. For example, the activity indications of the set that was utilized to determine a location may have been performed by the user and then the user may cease to provide search queries and/or other activity indications related to the location. The user may be subsequently provided with the travel-related information indications at a later time after the user has ceased to provide queries and/or perform activities that are related to the location.

In some implementations, a user may be provided with an indication of an available continued search that may be initiated based on a previously determined location. For example, the user may access a web browser and may be provided with a notification that one or more travel-related information indications have been previously determined and/or that additional travel-related information indications may be identified if additional searching is performed. In some implementations, a notification of an available continued search may be provided on one or more additional and/or alternative computing devices of a user from the computing device that was utilized to perform the one or more of the activities of the set of activity indications. For example, a user may utilize a desktop computer to submit one or more search queries that are identified as activity indications and the user may be provided the interface of FIG. 5 on a mobile device at a later time.

In some implementations, one or more of the travel-related information indications may be links to one or more documents that are associated with information that is related to the location. For example, referring to FIG. 5, text and/or one or more graphical components of the travel-related information indications may be selectable and selection of the component by the user may result in the browser 107 of computing device 105 navigating to a webpage that includes additional information. For example, the user may be provided attractions indication 500, the user may select "Willis Tower," and the browser 107 of computing device 105 may navigate to a homepage of a website for the Willis Tower.

In some implementations, a travel-related information indication may be a compilation of information from multiple documents. For example, travel information engine 125 may determine the listing of restaurants that are included in restaurants indication 505 based on identifying one or more restaurant webpages and/or by identifying one or more user rating webpages and compiling information from those webpages to determine the provided table. In some implementations, travel-related information indications may include a snippet of one or more documents. For example, each of the links of search results indication 510 ("ExampleUrl1.com," "ExampleUrl2.com," etc.) includes a shortened text from the webpage that is associated with the link ("Snippet of text from Webpage1," "Snippet of text from Webpage2", etc.). Also for example, the indication of "Restaurant 1" may additionally include the text from a webpage that is associated with Restaurant 1, such as "A Chicago favorite for generations, Restaurant 1 is located on the Magnificent Mile . . . . " In some implementations, one or more of the travel-related information indications may be selectable and selection by the user may result in the user being provided one or more documents. For example, "Restaurants Near Vacation Inn" of restaurants indication 505 may be selectable and the user may be provided with documents that are related to a search of restaurants near Vacation Inn.

In some implementations, travel information engine 125 may determine one or more travel-related information indications based on information that is associated with the determined location. For example, travel information engine 125 may identify information in content database 120 that includes standard information that is provided to users for a location. For example, users may always be provided a weather report as a travel-related information indication. Also, for example, users may be provided with local attractions for a location when that location is determined to be of interest to the user and the user is associated with an attribute of travelling with a family.

In some implementations, travel information engine 125 may determine one or more travel-related information indications based on one or more attributes of the user. For example, referring to FIG. 5, restaurants indication 505 includes two pizza restaurants. Travel information engine 125 may provide the user with pizza restaurants based on identifying an attribute of the user that indicates the user likes pizza restaurants (e.g., based on previous location identification of the user at pizza restaurants, posted reviews of restaurants by the user, identifying previous reservations of the user). Also, for example, travel information engine 125 may provide sports indication 515 based on identifying that the user has interest in baseball.

In some implementations, travel information engine 125 may provide one or more travel-related information indications based on a location that is associated with the user. For example, travel information engine 125 may identify a hotel reservation email of the user for the location and determine the address of the hotel. In some implementations, one or more travel-related information indications may be based on the hotel address. For example, referring to FIG. 5, restaurants indication 505 includes restaurants that are near "Vacation Inn." Travel information engine 125 may determine that the user is staying at the "Vacation Inn," based on one or more documents of the user, and provide indications of restaurants that are within a threshold distance of the "Vacation Inn."

In some implementations, one or more of the travel-related information indications may be determined based on a likely travel time of the user. For example, travel information engine 125 may determine one or more travel-related information indications that are tailored for the likely time that the user will be at the location. Referring to FIG. 5, travel information engine 125 may determine sports indication 515 based on identifying that the determined location is associated with a likely travel time of May 15 to May 20, and identifying baseball games that are taking place during those dates.

In some implementations, travel information engine 125 may provide a general travel information indication to the user. A general travel information indication may include an indication of the location and the user may select the general travel information indication to be provided with one or more travel-related information indications as described herein. For example, referring to FIG. 6, an example user interface is provided that includes a general travel information indication. General travel information indication 610 may be a link and user selection of the general travel information indication 610 may provide a listing of travel-related information indications, such as the collection of travel-related information indications that are illustrated in FIG. 5.

In some implementations, travel information engine 125 may provide a general travel information indication based on the travel-related score. For example, travel information engine 125 may determine a prominence of a general travel information indication and provide the general travel information indication based on the prominence. In some implementations, prominence may include a visual differentiation between the general travel information indication and one or more other indications (e.g., providing in a distinct color, size, and/or other visual indication). In some implementations, prominence may include a ranking of the general travel information indication in relation to other indications. For example, a user may be provided with the travel-related information indications of FIG. 6 and general travel information indication may be ranked relative to reminder indication 605 and traffic indication 600 based on the travel-related score of the Chicago location.

In some implementations, a collection of travel-related information indications may be provided to the user based on a user interface indication. As used herein, a user interface indication is an identifiable user interaction via a computing device that is unrelated to a search query submission by the user. For example, user interface indications may include an indication of a user unlocking and/or accessing a mobile device. Also, for example, user interface indications may include a user accessing one or more applications, such as a calendar application, a reminder application, and/or an activity suggestion application. As described herein, user interface indications are exclusive of indications of activities that are associated with the user submitting a query. For example, user interface activity indications do not include a user typing a query, a user submitting a query, and/or a user interacting with an interface to enter and/or submit a query (e.g., selecting a "Search" button, pressing "Enter" to submit a typed search query, speaking a command to submit a query).

Referring to FIG. 7, a flow chart is provided that illustrates a method for providing travel-related information to a user based on one or more activity indication of the user. Other implementations may perform the steps in a different order, omit certain steps, and/or perform different and/or additional steps than those illustrated in FIG. 7. For convenience, aspects of FIG. 7 will be described with reference to one or more components of FIG. 1 that may perform the method, such as the scoring engine 110, location determination engine 115, and/or travel information engine 125.

At step 700, a set of activity indications is identified based on entities that are associated with the activity indications. The set may be identified by a component that shares one or more characteristics with location determination engine 115. In some implementations, the set is identified based on the activity indications of the set being associated with one or more of the same entities. For example, two activity indications may be identified in a set based on both activity indications being associated with a "restaurants" entity. In some implementations, two or more activity indications may be identified in a set of activity indications based on one or more indirect associations between the entities associated with the activity indications of the set. For example, location determination engine 115 may identify a set of activity indications that includes an activity indication that is associated with a "Lincoln Park" entity and an activity indication that is associated with a "Lakeview" entity based on identifying associations between those entities and a "neighborhoods of Chicago" entity.

At step 705, a location is determined based on the set of activity indications. A location may be determined by a component that shares one or more characteristics with location determination engine 115. Location determination engine 115 may determine a location that is of likely interest to the user based on the activity indications of the set. In some implementations, a location may be determined based on associations between one or more of the entities of activity indications of the set and a location entity. For example, one or more of the entities of the activity indications of a set may be associated with a "Chicago" entity and location determination engine 115 may determine Chicago as a location based on the identified associations. In some implementations, location determination engine 115 may utilize user attributes, one or more documents, and/or attributes of one or more entities to determine a location.

At step 710, a travel-related score is determined for the location. The travel-related score is indicative of likelihood that the user has interest in being provided travel-related information that is related to the location. In some implementations, scoring engine 110 may determine a travel-related score based on one or more of the activity indications of the set that was utilized to determine the location. In some implementations, scoring engine 110 may determine one or more travel-related scores based on one or more entities that are associated with the activity indications, entities that are associated with the entities of the activity indications of the set, and/or additional information that is associated with the activity indications, the user, and/or the location.

In some implementations, a travel-related score for a location may be determined based on an indication of familiarity of the user with the location. In some versions of those implementations the travel-related score may be determined such that the travel-related score is more indicative of user interest in being provided travel-related information if the user activity indications relate to a non-familiar location than if the user activity indications relate to a familiar location. As one example, the user may be associated with one or more familiar locations, such as a "home" location and/or a "frequent travel" location, and the travel-related score may be determined such that travel-related scores for the familiar locations may be less indicative of user interest in being provided travel-related information about the location than travel-related scores for locations that are less familiar to the user. As another example, the activity indications of the user related to the location may be compared to other activity indications of the user to determine if the activity indications related to the location are "outliers" to the other activity indications. If the activity indications related to the location are outliers, it may indicate a lack of familiarity with the location and the travel-related score may be more indicative of user interest in being provided information about the location than if the activity indications were not outliers.

In some implementations, travel-related scores for a location may be adjusted based on an indication of the current date/time and one or more additional dates/times. For example, a travel-related score may be adjusted to indicate lower likelihood of the user having interest in traveling to a location as time since one or more of the user activity indications related to the location were performed increases. Also, for example, a travel-related score for a location may be "increased" as a determined likely travel date for the location approaches and the travel-related score may then decrease after the likely travel date has passed. In some implementations, a travel-related score may be adjusted based on a current location associated with the user and a location that is associated with the travel location. For example, a travel-related score may "increase" as the user travels closer to a determined location and "decrease" as the user travels farther away from the determined location.

At step 715, a collection of travel-related information indications is determined. The travel-related information indications may be determined by a component that shares one or more characteristics with travel information engine 125. In some implementations, the travel-related information indications of the collection may be determined based on one or more attributes of the user, information that is associated with one or more activity indications of the user, and/or based on other information that is associated with the location. For example, a user may be provided with travel-related information that includes a listing of popular tourist attractions of a location based on identifying ratings for tourist attractions and selecting one or more of the highest ranked attractions based on the ratings. Also, for example, a user may be provided with a weather forecast for a location for the next few days and/or for dates that correspond to likely travel dates of the user. In some implementations, the provided travel-related information indications may be selected for presentation to the user based on information that is associated with the user, information associated with the travel-related information indications, and/or properties of the activity indications of the set.

In some implementations, travel information engine 125 may determine one or more of the travel-related information indications based on ranking one or more documents that are related to the location. For example, travel information engine 125 may identify a plurality of documents, determine a ranking for the documents based on relatedness of the documents to travel to the location, and determine a travel-related information indication that includes a ranked list of the documents. In some implementations, rankings of one or more documents may be based on one or more of the activity indications of the set. For example, travel information engine 125 may determine rankings for one or more documents by identifying one or more entities from the documents and identifying relationships between the entities of the activity indications and the entities of the documents. In some implementations, the ranking of the documents may be based on the determined location. For example, one or more documents may be ranked based on a count of indications of the location that are identified in the documents and/or based on identifying entities in one or more of the documents that are associated with the entity that represents the location. In some implementations, one or more documents may be demoted and/or removed from a travel-related information indication of ranked documents based on the user previously accessing the one or more documents. For example, a travel-related information indication may include the ranked documents D1, D2, and D3, and the user may be provided a ranked list including only D2 and D3 (or a ranked list with D1 demoted in ranking) if the user has previously accessed D1.

At step 720, one or more travel-related information indications are provided to the user based on the travel-related score. In some implementations, travel-related information indications may be provided by a component that shares one or more characteristics with travel information engine 125. In some implementations, travel information engine 125 may provide the user with a general information indication that is associated with the location, and the user may select a provided general information indication to be provided the collection of travel-related information indications. For example, location determination engine 115 may determine a location of "Chicago," scoring engine 110 may determine a travel-related score for the location that is indicative of the user having interest in "Chicago," and travel-information engine 125 may provide a general information indication of "Chicago" to the user. The user may select the "Chicago" information indication to be provided with a collection of travel-related information indications.

In some implementations, one or more travel-related information indications may be provided based on a user interface activity indication. User interface activity indications may include one or more indications of user activity that are unrelated to the user submitting a query. For example, user interface activity indications may include a user turning on a mobile device, unlocking a mobile device, and/or the user accessing one or more applications, such as a reminder application and/or an activity suggestion application. User interface activity indications are unrelated to a user submitting a query. For example, user interface activity indications are unrelated to a user entering a query (e.g., typing, voice command) and/or the user submitting a query (e.g., selecting a submission graphical interface component, selecting a submission button, speaking a submission keyword).

In some implementations, one or more provided travel-related information indications may be provided based on a ranking of the travel-related information indications. For example, travel information engine 125 may determine a travel-related information indication from a webpage that was accessed by the user. Travel information engine 125 may determine a score for the travel-related information indication and/or rank the travel-related information indication in relation to one or more other travel-related information indications based on information that is associated with the webpage, the activity indication of the user accessing the webpage, and/or based on additional information that is associated with the user and/or the location. In some implementations, travel information engine 125 may provide one or more documents and/or indications of one or more documents based on a ranking of the documents. For example, travel information engine 125 may determine a ranking of one or more documents based on relatedness of the documents to travel to the location and provide the most pertinent documents to the user as travel-related information indications (e.g., one or more of the highest ranked documents, only documents with rankings above a threshold value).

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface input devices 822, user interface output devices 820, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to determine travel information to provide to a user based on activity indications of the user.

These software modules are generally executed by processor 814 alone or in combination with other processors. Memory 825 used in the storage subsystem can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several implementations have been described and illustrated herein, a variety of other means and/or structures for performing the function and/or obtaining the results and/ or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
   identifying a plurality of activity indications of a user, each of the activity indications associated with one or more entities;
   identifying a set of the activity indications from the plurality of activity indications based on one or more of the entities associated with the activity indications of the set;
   determining a location based on one or more of the entities associated with the activity indications of the set;
   determining a travel-related score for the location based on the activity indications of the set, wherein the travel-related score is indicative of likelihood that the user has interest in traveling to the location;
   determining a collection of travel-related information indications, wherein each of the travel-related information indications identifies travel-related information for the location that may be of interest to the user and wherein determining the collection of travel-related information indications comprises:
      identifying a plurality of documents related to travel to the location,
      ranking the plurality of documents,
      selecting one or more of the documents based on the ranking, and
      determining one or more of the travel-related information indications of the collection based on the selected one or more of the documents; and
   providing the collection of travel-related information indications based on the travel-related score satisfying a threshold and in response to a user interface activity indication.

2. The method of claim 1, further comprising:
   providing a general travel information indication related to the location based on the travel-related score, wherein the general travel information indication indicates the location and the presence of information related to travel to the location; and
   identifying a user selection of the general travel information indication;
   wherein providing the collection of travel-related information indications is in response to identifying the user selection of the general travel information indication.

3. The method of claim 1, wherein the ranking is based on at least one of the activity indications of the set of activity indications.

4. The method of claim 1, wherein the ranking is based on the determined location.

5. The method of claim 1, wherein the user activity indications are each associated with an activity type.

6. The method of claim 5, wherein determining the travel-related score is based on the activity type of at least one of the activity indications of the set.

7. The method of claim 1, wherein determining the travel-related score includes determining an activity time of at least one of the activity indications of the set and wherein determining the travel-related score is based on comparing the activity time of at least one of the activity indications of the set with the current time.

8. The method of claim 7, wherein an activity type of a given activity indication of the set is a search query and the activity time is based on a submission time of the search query by the user.

9. The method of claim 7, wherein the greater a difference is between the current time and the activity time, the less indicative the travel-related score is of user interest in traveling to the location.

10. The method of claim 1, wherein the travel-related information indications of the collection include one or more of: a snippet from and a link to a document, travel directions, and a point of interest suggestion.

11. The method of claim 1, wherein determining the travel-related score includes determining a likely travel time, the likely travel time indicative of when the user has interest in traveling to the location.

12. The method of claim 11, wherein determining the travel-related score occurs at a first time, and further comprising:
   adjusting the travel-related score at a second time based on the second time and the likely travel time, and wherein the second time is after the first time.

13. The method of claim 12, wherein adjusting the travel-related score includes adjusting the travel-related score to be more indicative of user interest in travelling to the location when the second time is closer to the likely travel time than the first time.

14. The method of claim 12, wherein adjusting the travel-related score includes adjusting the travel-related score to be less indicative of user interest in traveling to the location when the second time is after the likely travel time.

15. The method of claim 1, wherein determining the travel-related score includes identifying at least one user location that is associated with the user and comparing the user location to the determined location.

16. The method of claim 1, wherein determining the travel-related score is based on a familiarity measure indicative of familiarity of the user with one or more of the entities of the activity indications of the set.

17. The method of claim 1, further comprising:
   determining a current location of the user; wherein determining the travel-related score is based on a distance between the current location of the user and the location.

18. The method of claim 1, further comprising:
   determining a familiar location of the user; and
   wherein determining the travel-related score is based on comparison of the familiar location to the location.

19. A system including memory and one or more processors operable to execute instructions stored in the memory, comprising instructions to:
- identify a plurality of activity indications of a user, each of the activity indications associated with one or more entities;
- identify a set of the activity indications from the plurality of activity indications based on one or more of the entities associated with the activity indications of the set;
- determine a location based on one or more of the entities associated with the activity indications of the set;
- determine a travel-related score for the location based on the activity indications of the set, wherein the travel-related score is indicative of likelihood that the user has interest in traveling to the location;
- determine a collection of travel-related information indications, wherein each of the travel-related information indications identifies travel-related information for the location that may be of interest to the user and wherein the instructions to determine the collection of travel-related information indications include instructions to:
  - identify a plurality of documents related to travel to the location,
  - rank the plurality of documents,
  - select one or more of the documents based on the rank, and
  - determine one or more of the travel-related information indications of the collection based on the selected one or more of the documents; and
- provide the collection of travel-related information indications based on the travel-related score satisfying a threshold and in response to a user interface activity indication.

20. The system of claim 19, further comprising instructions to:
- provide a general travel information indication related to the location based on the travel-related score, wherein the general travel information indication indicates the location and the presence of information related to travel to the location; and
- identify a user selection of the general travel information indication;
- wherein the instructions to provide the collection of travel-related information include instructions to provide the collection of travel-related information indications in response to identifying the user selection of the general travel information indication.

21. The system of claim 19, wherein the rank is based on at least one of the activity indications of the set of activity indications.

22. The system of claim 19, wherein the rank is based on the determined location.

23. The system of claim 19, wherein the instructions to determine the travel-related score include instructions to determine an activity time of at least one of the activity indications of the set and determine the travel-related score based on comparing the activity time of at least one of the activity indications of the set with the current time.

24. The system of claim 23, wherein an activity type of a given activity indication of the set is a search query and the activity time is based on a submission time of the search query by the user.

25. The system of claim 23, wherein the greater a difference is between the current time and the activity time, the less indicative the travel-related score is of user interest in traveling to the location.

26. The system of claim 19, wherein the instructions to determine the travel-related score include instructions to determine a likely travel time, the likely travel time indicative of when the user has interest in traveling to the location.

27. The system of claim 26, wherein the travel-related score is determined at a first time, and further comprising instructions to:
- adjust the travel-related score at a second time based on the second time and the likely travel time, and wherein the second time is after the first time.

28. The system of claim 26, wherein the instructions to adjust the travel-related score include instructions to adjust the travel-related score to be more indicative of user interest in travelling to the location when the second time is closer to the likely travel time than the first time.

29. The system of claim 26, wherein the instructions to adjust the travel-related score include instructions to adjust the travel-related score to be less indicative of user interest in traveling to the location when the second time is after the likely travel time.

30. The system of claim 19, wherein the instructions to determine the travel-related score include instructions to determine the travel-related score based on identifying at least one user location that is associated with the user and comparing the user location to the determined location.

31. A non-transitory computer readable storage medium storing computer instructions executable by a processor to perform a method comprising:
- identifying a plurality of activity indications of a user, each of the activity indications associated with one or more entities;
- identifying a set of the activity indications from the plurality of activity indications based on one or more of the entities associated with the activity indications of the set;
- determining a location based on one or more of the entities associated with the activity indications of the set;
- determining a travel-related score for the location based on the activity indications of the set, wherein the travel-related score is indicative of likelihood that the user has interest in traveling to the location;
- determining a collection of travel-related information indications, wherein each of the travel-related information indications identifies travel-related information for the location that may be of interest to the user and wherein determining the collection of travel-related information indications comprises:
  - identifying a plurality of documents related to travel to the location,
  - ranking the plurality of documents,
  - selecting one or more of the documents based on the ranking, and
  - determining one or more of the travel-related information indications of the collection based on the selected one or more of the documents; and
- providing the collection of travel-related information indications based on the travel-related score satisfying a threshold and in response to a user interface activity indication.

32. A computer implemented method, comprising:
- identifying a plurality of activity indications of a user, each of the activity indications associated with one or more entities;
- identifying a set of the activity indications from the plurality of activity indications based on one or more of the entities associated with the activity indications of the set;
- determining a location based on one or more of the entities associated with the activity indications of the set;

determining a travel-related score for the location based on the activity indications of the set and based on a familiarity measure indicative of familiarity of the user with one or more of the entities of the activity indications of the set, wherein the travel-related score is indicative of likelihood that the user has interest in traveling to the location;

determining a collection of travel-related information indications, wherein each of the travel-related information indications identifies travel-related information for the location that may be of interest to the user; and providing the collection of travel-related information indications based on the travel-related score satisfying a threshold and in response to a user interface activity indication.

33. The method of claim 32, further comprising:

providing a general travel information indication related to the location based on the travel-related score, wherein the general travel information indication indicates the location and the presence of information related to travel to the location; and identifying a user selection of the general travel information indication;

wherein providing the collection of travel-related information indications is in response to identifying the user selection of the general travel information indication.

34. The method of claim 32, wherein the travel-related information indications of the collection include one or more of: a snippet from and a link to a document, travel directions, and a point of interest suggestion.

35. A system including memory and one or more processors operable to execute instructions stored in the memory, comprising instructions to:

identify a plurality of activity indications of a user, each of the activity indications associated with one or more entities;

identify a set of the activity indications from the plurality of activity indications based on one or more of the entities associated with the activity indications of the set;

determine a location based on one or more of the entities associated with the activity indications of the set;

determine a travel-related score for the location based on the activity indications of the set and based on a familiarity measure indicative of familiarity of the user with one or more of the entities of the activity indications of the set, wherein the travel-related score is indicative of likelihood that the user has interest in traveling to the location;

determine a collection of travel-related information indications, wherein each of the travel-related information indications identifies travel-related information for the location that may be of interest to the user; and provide the collection of travel-related information indications based on the travel-related score satisfying a threshold and in response to a user interface activity indication.

36. The system of claim 35, further comprising instructions to:

provide a general travel information indication related to the location based on the travel-related score, wherein the general travel information indication indicates the location and the presence of information related to travel to the location; and identify a user selection of the general travel information indication;

wherein the instructions to provide the collection of travel-related information include instructions to provide the collection of travel-related information indications in response to identifying the user selection of the general travel information indication.

37. A computer implemented method, comprising:

identifying a plurality of activity indications of a user, each of the activity indications associated with one or more entities;

identifying a set of the activity indications from the plurality of activity indications based on one or more of the entities associated with the activity indications of the set;

determining a location based on one or more of the entities associated with the activity indications of the set;

determining a travel-related score for the location based on the activity indications of the set, wherein the travel-related score is indicative of likelihood that the user has interest in traveling to the location, wherein an activity type of a given activity indication of the activity indications of the set is a search query and wherein determining the travel-related score includes determining an activity time of the given activity indication based on a submission time of the search query and determining the travel-related score based on comparing the activity time of the search query with a current time;

determining a collection of travel-related information indications, wherein each of the travel-related information indications identifies travel-related information for the location that may be of interest to the user; and providing the collection of travel-related information indications based on the travel-related score satisfying a threshold and in response to a user interface activity indication.

38. The method of claim 37, further comprising:

providing a general travel information indication related to the location based on the travel-related score, wherein the general travel information indication indicates the location and the presence of information related to travel to the location; and identifying a user selection of the general travel information indication;

wherein providing the collection of travel-related information indications is in response to identifying the user selection of the general travel information indication.

39. A system including memory and one or more processors operable to execute instructions stored in the memory, comprising instructions to:

identify a plurality of activity indications of a user, each of the activity indications associated with one or more entities;

identify a set of the activity indications from the plurality of activity indications based on one or more of the entities associated with the activity indications of the set;

determine a location based on one or more of the entities associated with the activity indications of the set;

determine a travel-related score for the location based on the activity indications of the set and based on a familiarity measure indicative of familiarity of the user with one or more of the entities of the activity indications of the set, wherein the travel-related score is indicative of likelihood that the user has interest in traveling to the location, wherein an activity type of a given activity indication of the activity indications of the set is a search query and wherein the instructions to determine the travel-related score include instructions to determine an activity time of the given activity indication based on a submission time of the search query and determine the travel-related score based on comparing the activity time of the search query with a current time;

determine a collection of travel-related information indications, wherein each of the travel-related information indications identifies travel-related information for the location that may be of interest to the user; and provide the collection of travel-related information indications based on the travel-related score satisfying a threshold and in response to a user interface activity indication.

40. The system of claim 39, further comprising instructions to:

provide a general travel information indication related to the location based on the travel-related score, wherein the general travel information indication indicates the location and the presence of information related to travel to the location; and identify a user selection of the general travel information indication;

wherein the instructions to provide the collection of travel-related information include instructions to provide the collection of travel-related information indications in response to identifying the user selection of the general travel information indication.

\* \* \* \* \*